US012603974B2

(12) United States Patent
Xian et al.

(10) Patent No.: US 12,603,974 B2
(45) Date of Patent: Apr. 14, 2026

(54) LCD PROJECTOR WITH MULTIPLE DISPLAY SCREENS AND LENSES

(71) Applicant: Chengdu Jishen Creative Technology Co., Ltd., Chengdu (CN)

(72) Inventors: Shanhong Xian, Chengdu (CN); Youhui Ren, Chengdu (CN); Xingwang Cao, Chengdu (CN)

( * ) Notice: Subject to any disclaimer, the term of this patent is extended or adjusted under 35 U.S.C. 154(b) by 428 days.

(21) Appl. No.: 18/386,158

(22) Filed: Nov. 1, 2023

(65) Prior Publication Data

US 2025/0106367 A1     Mar. 27, 2025

(30) Foreign Application Priority Data

Sep. 23, 2023     (CN) .......................... 202311233920.3
Sep. 23, 2023     (CN) .......................... 202322589071.7

(51) Int. Cl.
*H04N 9/31*          (2006.01)
(52) U.S. Cl.
CPC ......... *H04N 9/3147* (2013.01); *H04N 9/3105* (2013.01)
(58) Field of Classification Search
CPC .... G03B 21/00; G03B 21/005; G03B 21/006; G03B 21/14; G03B 21/145; G03B 21/208; G03B 21/2013; G03B 21/2033; H04N 9/315; H04N 9/317; H04N 9/3105; H04N 9/3141; H04N 9/3147; H04N 9/3152; H04N 9/3158; H04N 9/3161; H04N 9/3164
See application file for complete search history.

(56) References Cited

U.S. PATENT DOCUMENTS

| | | | | |
|---|---|---|---|---|
| 2021/0124248 A1* | 4/2021 | Guo | ........................ | G03B 21/16 |
| 2021/0302811 A1* | 9/2021 | Guo | ........................ | G03B 21/16 |
| 2023/0075173 A1* | 3/2023 | Chen | ................. | G03B 21/2033 |

* cited by examiner

*Primary Examiner* — Sultan Chowdhury
(74) *Attorney, Agent, or Firm* — Daniel M. Cohn; Howard M. Cohn

(57)          ABSTRACT
The present disclosure provides a LCD projector with multiple display screens and lenses, comprising: light sources, collimating lenses, LCD imagers, field lenses and imaging lenses; the collimating lenses, the LCD imagers, the field lenses and the imaging lenses are sequentially arranged on the optical path emitted by the light sources; the collimating lenses, the LCD imagers and the field lenses are all arranged in parallel; the vertical axes of the collimating lenses, the LCD imagers and the field lenses are maintained on the same axes as the vertical axes of the light emitted by the light sources; the light sources, the collimating lenses, the LCD imagers, the field lenses and the imaging lenses constitute a plurality of groups of imaging groups.

8 Claims, 6 Drawing Sheets light source        light source        light source

LCD PROJECTOR WITH MULTIPLE DISPLAY SCREENS AND LENSES

TECHNICAL FIELD

The present disclosure relates to a technical field of optical structure display of projector, and in particular to a LCD projector with multiple display screens and lenses.

BACKGROUND

LCD projector (Liquid Crystal projector) are high-tech products brought about by the development of LCD technology, lighting technology, and integrated circuits. The key technology is the manufacturing of LCD panels. LCD projectors utilize the photoelectric effect of liquid crystals, where the arrangement of liquid crystal molecules changes under the action of an electric field, affecting the transmittance or reflectivity of their liquid crystal units, thereby affecting their optical properties and producing images with different grayscale levels and colors.

Compared to DLP (Digital Light Processing) projector technology, the cost of LCD projector technology is much lower. However, existing LCD projectors have the defect of low transmittance leading to low brightness output, and each LCD screen bears relatively high thermal energy, which is not conducive to the safety of the projector's operation.

In addition, for the LCD light valve using black and white liquid crystal imager, through the "three primary color principle", also known as RGB color model or red, green and blue color model, is an additive color model. Add the colors of red, green, and blue in different proportions to produce a variety of colored lights. That is, through three-color light with lighting to display a full-color image, the optical structure needs to use three component image set, through the different three primary colors for light source lighting to form a full-color image, but it will lead to the improvement of production costs, is not conducive to promotion.

SUMMARY

The present disclosure provides a LCD projector with multiple display screens and lenses, in order to solve the defect of low brightness output caused by low transmittance of LCD projector, and the light and heat energy of each LCD screen is relatively high, which is not conducive to the safety of the projector and the technical problems of increasing the production cost.

The purpose of the present application can be achieved through the following technical solutions: light sources, collimating lenses, LCD imagers, field lenses and imaging lenses; the collimating lenses, the LCD imagers, the field lenses and the imaging lenses are sequentially arranged on the optical path emitted by the light sources; the collimating lenses, the LCD imagers and the field lenses are all arranged in parallel; the vertical axes of the collimating lenses, the LCD imagers and the field lenses are maintained on the same axes as the vertical axes of the light emitted by the light sources; the light sources, the collimating lenses, the LCD imagers, the field lenses and the imaging lenses constitute a plurality of groups of imaging groups.

Furthermore, the light sources, the collimating lenses, the LCD imagers, the field lenses and the imaging lenses constitute three group of imaging groups as the same; with the middle imaging group as the standard image position, the right or left axis projection of the image is performed by moving the imaging lenses at both ends, and overlaps with the image of the middle imaging group.

Furthermore, three group of the imaging groups of the light sources are white light; the LCD imagers are full color LCD imagers, thus constituting the first imaging unit.

Furthermore, three group of the imaging groups of the light sources are white light; the LCD imagers are full color LCD imagers, thus constituting the first imaging unit.

Furthermore, the light sources, the collimating lenses, the LCD imagers, the field lenses and the imaging lenses constitute two group of imaging groups as the same; using the middle separation line of the two imaging groups as the centerline, the right or left axis projection of the image is performed by moving the imaging lenses at both ends, and converges with the two images to form one image.

Furthermore, two group of the imaging groups of the light sources are white light; the LCD imagers are full color LCD imagers, thus constituting the third imaging unit.

Furthermore, one group of light sources is either a red light source, a green light source, or a blue light source, while the other group of light sources is a dual color time-sharing driving light source with different colors from the previous group of light sources; the LCD imagers are black and white LCD imagers, thus constituting the fourth imaging unit.

Furthermore, the adjacent two group of imaging groups are arranged in equal spacing, in the same plane, and in parallel.

The present disclosure has beneficial effects as follows.

1. The present disclosure relates to the optical architecture of a projector, which proposes the use of multiple groups of LCD screens and multiple lenses to achieve the convergence and synthesis of projected images. This enables the projector composed of a full color LCD screen using LCD light valve devices and a black and white LCD screen imager to efficiently and easily converge and project while sharing the high thermal energy brought by illumination, thereby doubling the brightness.

2. Adopting a multi group LCD display screen and multi lens architecture to achieve projection display by converging projected composite images, greatly improving the brightness output of such projection, while dispersing the heat received by each LCD display screen, especially with the emergence of high-resolution black and white LCD light valves. Using this technology, the light efficiency of DLP projectors can be achieved or exceeded.

BRIEF DESCRIPTION OF DRAWINGS

In order to more clearly illustrate technical solutions in embodiments of the present disclosure, drawings required in description or prior art are briefly introduced below, and obviously, the drawings in the following description are merely some embodiments of the present disclosure. For a person having ordinary skill in art, other drawings may be obtained according to the drawings without creative efforts.

REFERENCE NUMBER IN THE DRAWINGS

Figure 1:
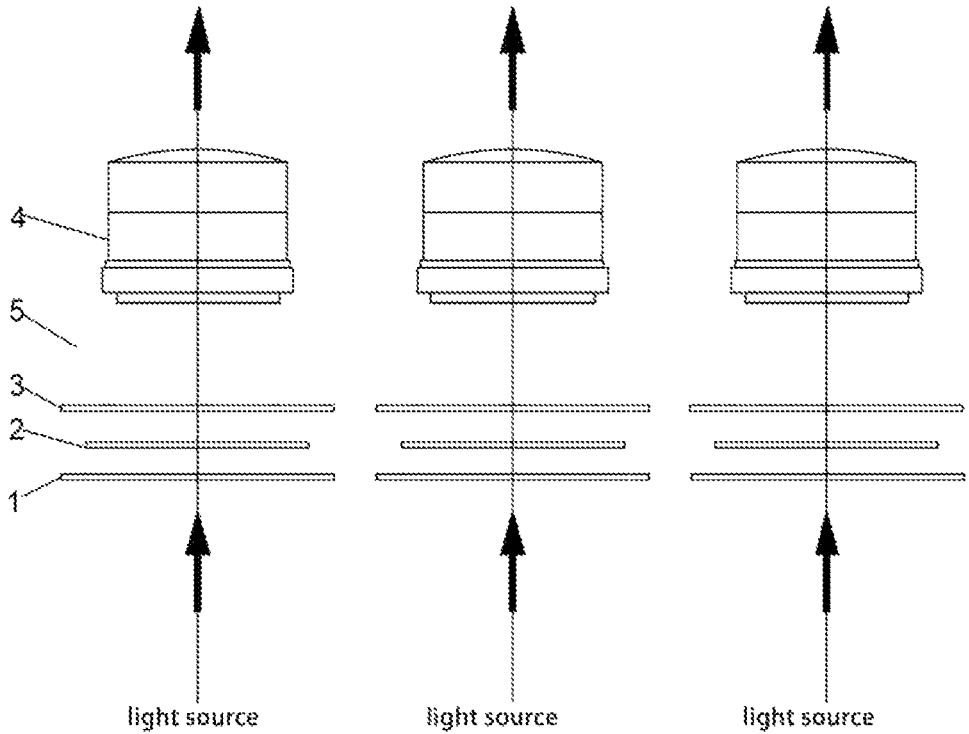
FIG. 1 is a structural schematic diagram of the first imaging unit of the LCD projector with multiple display screens and lenses.

| | |
|---|---|
| collimating lenses | 1 |
| LCD imagers | 2 |
| field lenses | 3 |
| imaging lenses | 4 |
| first imaging unit | 5 |
| second imaging unit | 6 |
| third imaging unit | 7 |
| fourth imaging unit | 8 |

DETAILED DESCRIPTION

The following describes in detail the embodiments of the present disclosure, examples of which are illustrated in the accompanying drawings, wherein the same or similar reference numerals refer to the same or similar elements or elements having the same or similar functions throughout. The embodiments described below with reference to the accompanying drawings are exemplary, and are not intended to limit the present disclosure.

In order to make the purpose, technical solutions, and advantages of the present disclosure clear, the following further describes the present disclosure in detail with reference to accompanying drawings and embodiments.

The present disclosure is provided a LCD projector with multiple display screens and lenses.

Example 1

Referring to FIG. 1, the embodiment of the present disclosure provides a LCD projector with multiple display screens and lenses, comprising: light sources, collimating lenses 1, LCD imagers 2, field lenses 3 and imaging lenses 4; the collimating lenses 1, the LCD imagers 2, the field lenses 3 and the imaging lenses 4 are sequentially arranged on the optical path emitted by the light sources; the imaging lenses 4 perform imaging processing on the light emitted by the illuminating light sources; the collimating lenses 1, the LCD imagers 2 and the field lenses 3 are all arranged in parallel; the vertical axes of the collimating lenses 1, the LCD imagers 2 and the field lenses 3 are maintained on the same axes as the vertical axes of the light emitted by the light sources.

The light sources, the collimating lenses 1, the LCD imagers 2, the field lenses 3 and the imaging lenses 4 constitute a plurality of group of imaging groups. The light sources, the collimating lenses 1, the LCD imagers 2, the field lenses 3 and the imaging lenses 4 constitute three group of imaging groups as the same; with the middle imaging group as the standard image position, the right or left axis projection of the image is performed by moving the imaging lenses 4 at both ends, and overlaps with the image of the middle imaging group; three group of the imaging groups of the light sources are white light; the LCD imagers 2 are full color LCD imagers, thus constituting the first imaging unit 5.

Each imaging group includes: The collimating lense 1 that makes the illumination light more parallel to the light, the full-color liquid crystal imaging module of transmission imaging-full-color LCD, the field lense 3 that converges the image light output of the full-color LCD to facilitate the imaging of the lens imaging, the image light is projected out to form the imaging lens of the imaging lenses 4, By adjusting the relative position and focus of the lens, the three groups of projected images can obtain an image at the front end that is three times brighter than the single group of images.

Firstly, synchronize the full color LCDs in all three imaging groups to display the same video image. Using the middle imaging group as the standard image position, adjust the position of imaging lens 4 of the first imaging group to move towards the lens of the second imaging group to achieve a right offset projection of the image and overlap with the image of the second imaging group. Similarly, adjust the position of the imaging lens 4 of the third imaging group to move it towards the lens of the second imaging group to project the left offset axis of the image and coincide with the image of the second imaging group. On the basis of this adjustment, adjust the positions of the three groups of imaging lenses 4 and their respective LCD imagers 2 to make the image clear and obtain a high brightness full color image. The brightness of the projected image is three times that of a single group, which effectively solves the defect of low brightness output caused by low transmittance of LCD. And the photothermal energy borne by each LCD screen is only one-third of that of a single LCD screen, ensuring the reliability of operation. This display configuration is a "full color three-displays and three-lenses" configuration.

Example 2

Figure 2:
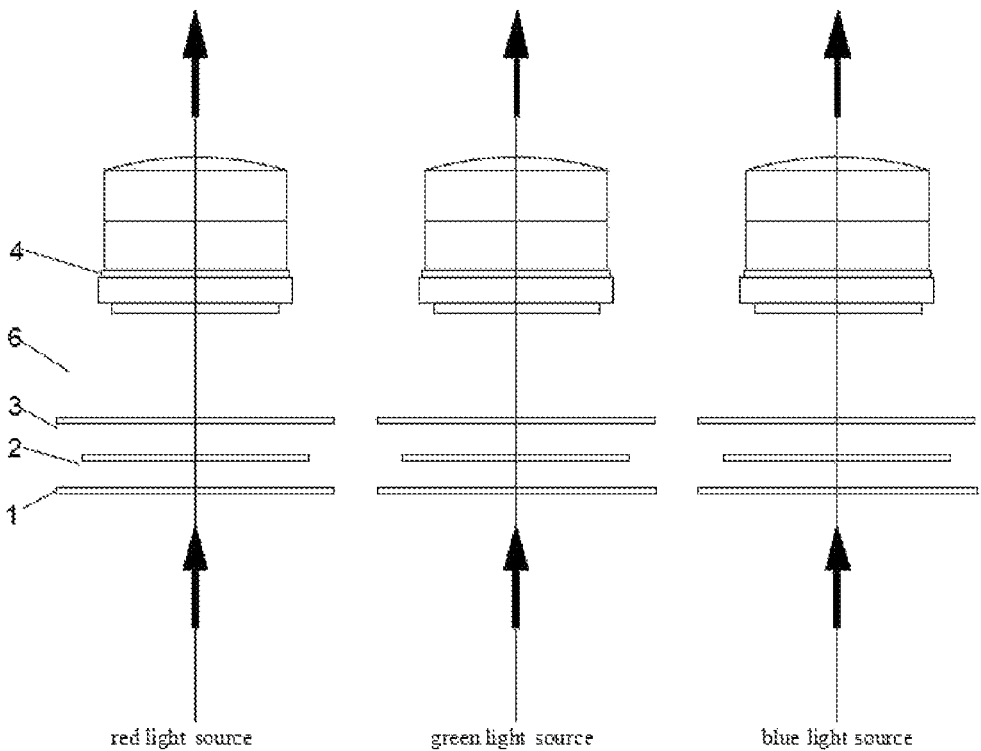
FIG. 2 is a structural schematic diagram of the second imaging unit of the LCD projector with multiple display screens and lenses.

Referring to FIG. 2, the light sources, the collimating lenses 1, the LCD imagers 2, the field lenses 3 and the imaging lenses 4 constitute a plurality of group of imaging groups. The light sources, the collimating lenses 1, the LCD imagers 2, the field lenses 3 and the imaging lenses 4 constitute three group of imaging groups as the same; with the middle imaging group as the standard image position, the right or left axis projection of the image is performed by moving the imaging lenses 4 at both ends, and overlaps with the image of the middle imaging group; the light sources in the three group of imaging groups respectively adopts different red light source, green light source or blue light source; the LCD imagers are black and white LCD imagers, thus constituting the second imaging unit 6.

To form a color image, at least three primary colors, namely red, green and blue, are required to form a monochrome image synthesis. In this configuration, three groups of imaging groups are configured to complete three monochrome images in a self-arranged sequence. As can be seen from FIG. 2, once the color of the images displayed in the group is specified, the corresponding lighting source must also be set to be consistent with the color of the images to be displayed. Therefore, the light source is divided into R, G, and B three colors of light. At this point, the "black and white three-displays and three-lenses" optical mechanism type is completed.

When the projection machine is thus formed, the R, G and B image signals of the image processing board output to the black and white LCD display should be sent to the three black and white LCD displays according to the color of the light source. And ensure the consistency of the time sequence of the display image, and then by adjusting the convergence and focusing, you can obtain a bright full-color image at the projection end, and the convergence and focusing mode is the same as the aforementioned "full-color three-displays and three-lenses".

Example 3

Figure 3:
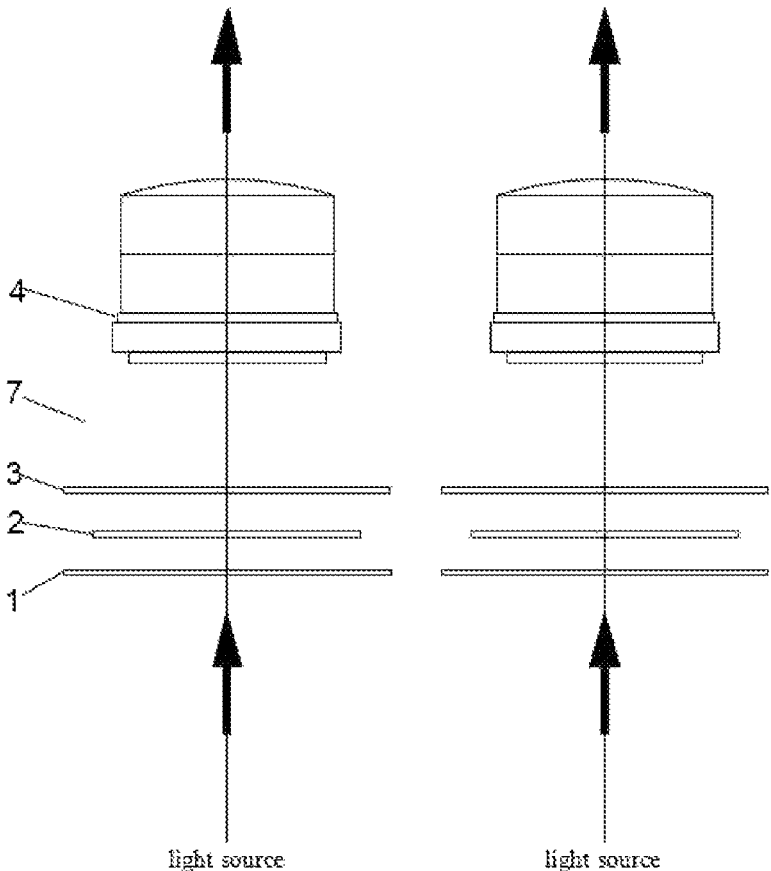
FIG. 3 is a structural schematic diagram of the third imaging unit of the LCD projector with multiple display screens and lenses.

Referring to FIG. 3, the light sources, the collimating lenses 1, the LCD imagers 2, the field lenses 3 and the imaging lenses 4 constitute two group of imaging groups as the same; using the middle separation line of the two imaging groups as the centerline, the right or left axis projection of the image is performed by moving the imaging lenses 4 at both ends, and converges with the two images to form one image. Two group of the imaging groups of the light sources are white light; the LCD imagers 2 are full color LCD imagers, thus constituting the third imaging unit 7.

The above forms the configuration of "full-color three-displays and three-lenses" or "double-displays and double-lenses", its working principle is similar to the "three-displays and three-lenses", except that a set of imaging units is missing, which can reduce costs. By adjusting the relative position and focus of the lenses, the projected two groups of images can obtain an image with twice the brightness of the single group image at the front end. The method is described as follows: first, synchronize the full color LCDs in both imaging groups to display the same video image. With the middle dividing line as the "center position", adjust the imaging lens 4 position of the first imaging group (shown on the left) to move towards the "center position" to achieve the right off-axis projection of the image. Similarly, adjust the imaging lens 4 position of the second imaging group (shown on the right) to move towards the "center position" to achieve the left off-axis projection of the image. The distance between the two lenses moving towards the "center position" should be equal and the two images should converge into one image. The brightness of its projected image is twice that of a single group, while the photothermal energy borne by each LCD screen is only half, ensuring the reliability of the work.

The biggest feature of the above configuration is that the LCD light valve adopts a full color screen. That is, as long as under the illumination of the white light source, the color image will be presented; each group of display units displays the same image content and color at the same time. The lighting of each display group is also the same white light source, and it is a constant bright state without time sequence, so the configuration is simple and the image segmentation is easy to achieve.

Example 4

Figure 4:
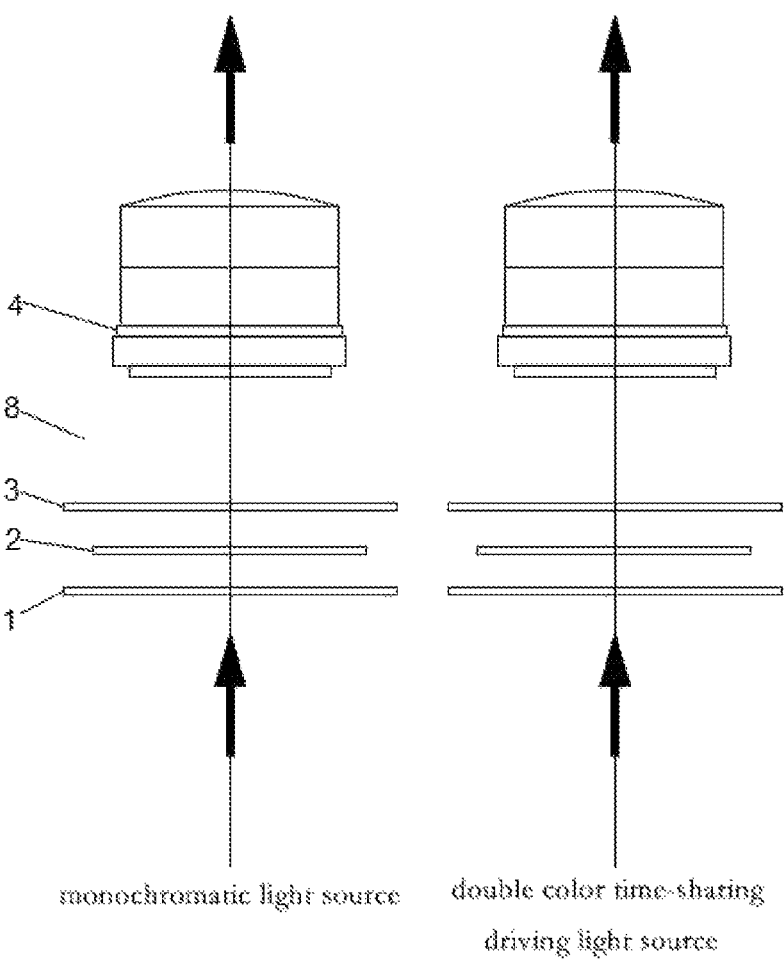
FIG. 4 is a structural schematic diagram of the fourth imaging unit of the LCD projector with multiple display screens and lenses.
Figure 5:
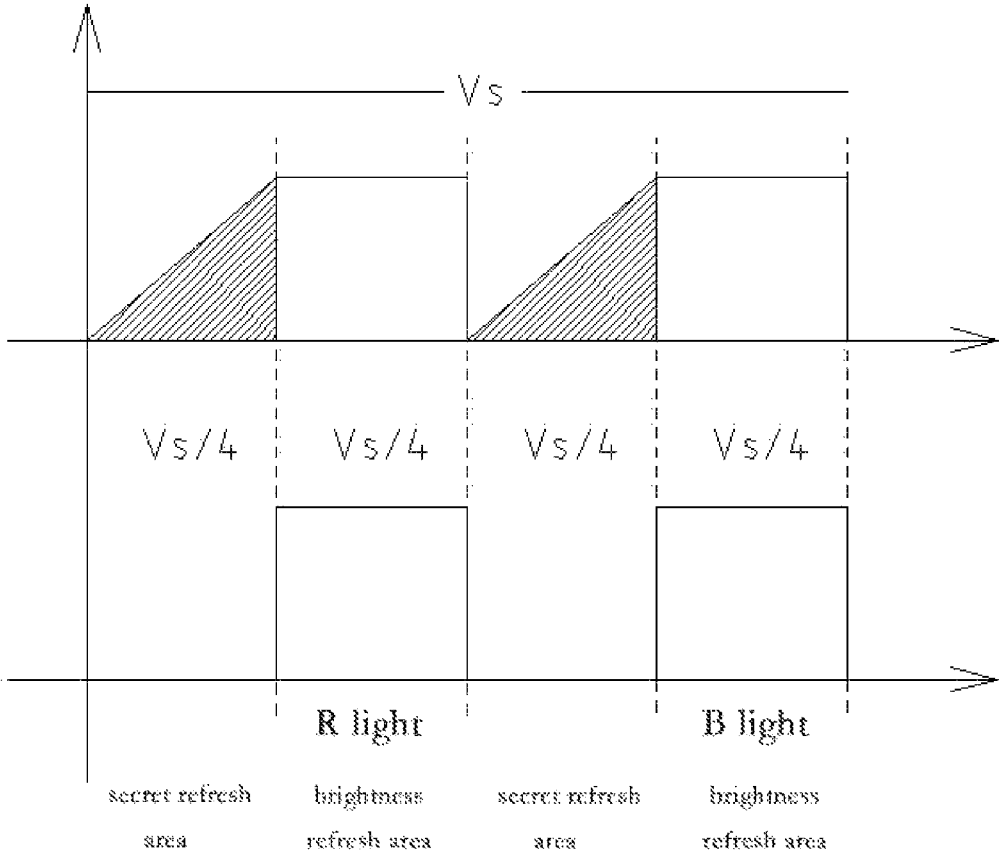
FIG. 5 is a schematic diagram of the image input and light sources timing of the black and white dual color display screen of the LCD projector with multiple display screens and lenses.
Figure 6:
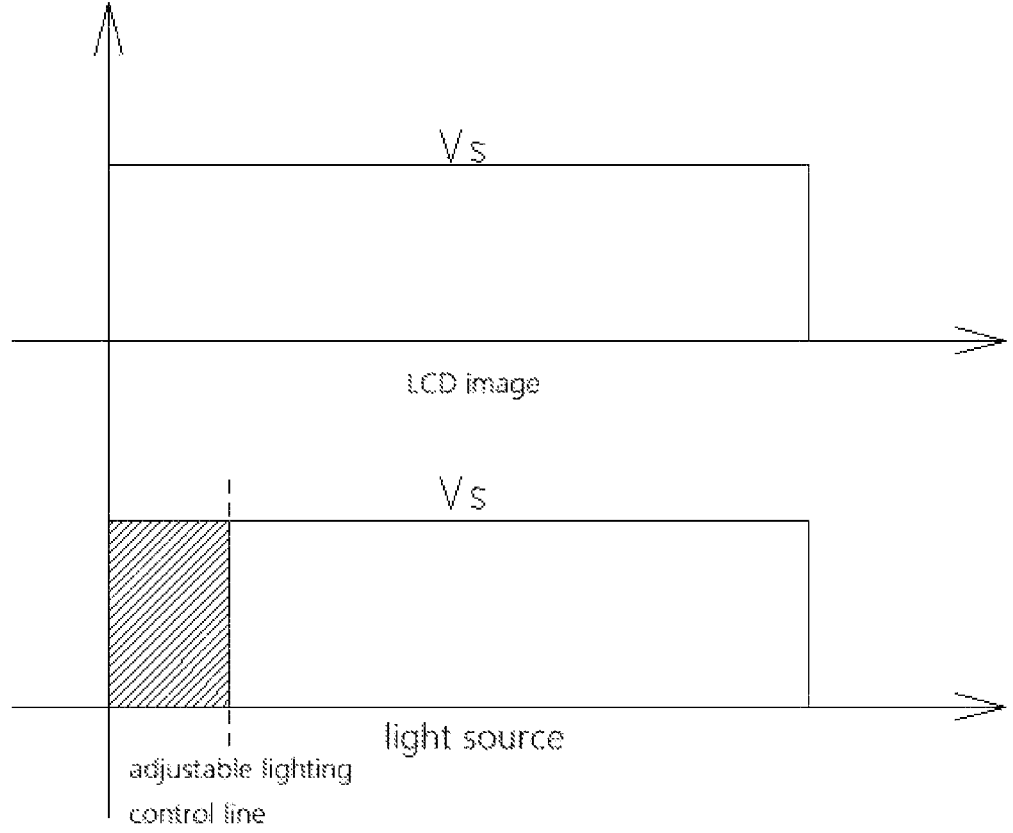
FIG. 6 is a schematic diagram of the single image display black and white LCD and light sources timing of the LCD projector with multiple display screens and lenses.

Referring to FIGS. 4 to 6, the light sources, the collimating lenses 1, the LCD imagers 2, the field lenses 3 and the imaging lenses 4 constitute two group of imaging groups as the same; using the middle separation line of the two imaging groups as the centerline, the right or left axis projection of the image is performed by moving the imaging lenses 4 at both ends, and converges with the two images to form one image. One group of light sources is either a red light source, a green light source, or a blue light source, while the other group of light sources is a dual color time-sharing driving light source with different colors from the previous group of light sources; the LCD imagers 2 are black and white LCD imagers, thus constituting the fourth imaging unit 8.

The above components constitute a "black and white double-displays and double-lenses" configuration, to form a full color image, must be composed of at least red, green and blue three primary color images. The present disclosure has only two black and white LCD screens. If color images are to be displayed, one of the black and white LCD screens shall realize image display of two colors within the display time (Vs) of one frame image, and then form a full-color image with the image displayed on the other screen. The light source corresponding to the black and white LCD display that bears the two colors must also be able to provide the lighting of these two colors.

For the "black and white double-displays and double-lenses" configuration, the following definition of the noun is explained:

Secret refreshes: when writing the data to be displayed point by point on the LCD screen, the corresponding light source is in an off state.

Brightness refreshes: when writing the data to be displayed point by point on the LCD screen, the corresponding light source is in a lit state.

Vs, the time to complete the display of one frame of image. For LCD panels, the display time is also the time to complete refreshing all pixels. The current full color LCD screens have a Vs of $\frac{1}{60}$ second, and some support $\frac{1}{120}$ second or higher.

FIG. 5 of the instruction manual shows the timing diagram of the operation of the black and white three-displays and three-lenses LCD, which illustrates the configuration of the "black and white three-displays and three-lenses LCD". The working time sequence of an LCD screen display two different images within one Vs. The shaded part in the figure represents the secret refreshes time, which is Vs/4. During this time period, it is necessary to complete: 1. refresh all the previous image data in the LCD; 2. during this time period, the light source is turned off.

After the first secret refreshes time has ended, execute brightness refreshes to display the image data just written. During this time period, it is necessary to complete: 1. press the color of the input image (red image in FIG. 2-4) to light up the corresponding color of the light source, and project the image; 2. during this brightness refreshes period, in order to avoid the loss of data written by the previous secret refreshes, it is necessary to repeatedly refresh the data during the secret refreshes into the LCD, displaying while refreshing.

After the display cycle of the first color image from secret refreshes to brightness refreshes ends, the LCD enters the display cycle of another color image (blue image in FIG. 2-4). At this point, the remaining image data in the LCD is the previous color, so the process of writing and refreshing new data requires turning off the light source. However, the shorter the secret refreshes time, the more time is left for displaying the image (brightness refreshes time), which cannot guarantee the color restoration and brightness indicators of the projected image. Therefore, the following settings are required:

1. The refresh rate of the LCD screen responsible for double color display must be more than 4 times the original display frame rate of the projected image in order to complete the double (including 4th harmonic) color display task. In FIG. 5, the frame rate of the original image is 60 Hz, therefore, the display time left for both color images is Vs/4.

2. Even if the display time of each color image is only Vs/4, the refresh rate of the LCD screen must be greater than or equal to Vs/4 in order to ensure the color restoration and brightness indicators of the projected image as much as possible.

The projector or complete machine composed of FIG. 5 in the instruction manual processes, displays, and projects signals in the above manner. By adjusting the convergence and focus of the lens, a bright full color image can be obtained at the projection end. FIG. 6 of the instruction manual describes the working sequence of another LCD screen that takes on monochromatic images. In the figure, a green G image is displayed. As it follows the Vs cycle of the original image, there is no secret refreshes time. Just to adjust the white balance after converging with the dual color display image, the delayed lighting area in the shaded part of the image has been set, and this function is completed by the projection control board.

Above are only preferred embodiments of the present disclosure and are not intended to limit the present disclosure. Any modification, equivalent replacement and improvement made within spirit and principle of the present disclosure should be included in protection scope of the present disclosure.

What is claimed is:

1. A LCD projector with multiple display screens and lenses, comprising:

light sources, collimating lenses, LCD imagers, field lenses and imaging lenses;

the collimating lenses, the LCD imagers, the field lenses and the imaging lenses are sequentially arranged on the optical path emitted by the light sources;

the collimating lenses, the LCD imagers and the field lenses are all arranged in parallel; the vertical axes of the collimating lenses, the LCD imagers and the field lenses are maintained on the same axes as the vertical axes of the light emitted by the light sources;

the light sources, the collimating lenses, the LCD imagers, the field lenses and the imaging lenses constitute a plurality of groups of imaging groups.

2. The LCD projector with multiple display screens and lenses of claim 1, wherein the light sources, the collimating lenses, the LCD imagers, the field lenses and the imaging lenses constitute three group of imaging groups as the same; with the middle imaging group as the standard image position, the right or left axis projection of the image is performed by moving the imaging lenses at both ends, and overlaps with the image of the middle imaging group.

3. The LCD projector with multiple display screens and lenses of claim 2, wherein three group of the imaging groups of the light sources are white light; the LCD imagers are full color LCD imagers, thus constituting the first imaging unit.

4. The LCD projector with multiple display screens and lenses of claim 2, wherein the light sources in the three group of imaging groups respectively adopts different red light source, green light source or blue light source; the LCD imagers are black and white LCD imagers, thus constituting the second imaging unit.

5. The LCD projector with multiple display screens and lenses of claim 1, wherein the light sources, the collimating lenses, the LCD imagers, the field lenses and the imaging lenses constitute two group of imaging groups as the same; using the middle separation line of the two imaging groups as the centerline, the right or left axis projection of the image is performed by moving the imaging lenses at both ends, and converges with the two images to form one image.

6. The LCD projector with multiple display screens and lenses of claim 5, wherein two group of the imaging groups of the light sources are white light; the LCD imagers are full color LCD imagers, thus constituting the third imaging unit.

7. The LCD projector with multiple display screens and lenses of claim 5, wherein one group of light sources is either a red light source, a green light source, or a blue light source, while the other group of light sources is a dual color time-sharing driving light source with different colors from the previous group of light sources; the LCD imagers are black and white LCD imagers, thus constituting the fourth imaging unit.

8. The LCD projector with multiple display screens and lenses of claim 7, the adjacent two group of imaging groups are arranged in equal spacing, in the same plane, and in parallel.

* * * * *